United States Patent
Ohmura

(10) Patent No.: US 9,106,018 B2
(45) Date of Patent: Aug. 11, 2015

(54) HALF FITTING PREVENTION CONNECTOR

(75) Inventor: Takenori Ohmura, Kakegawa (JP)

(73) Assignee: Yazaki Corporation, Tokyo (JP)

(*) Notice: Subject to any disclaimer, the term of this patent is extended or adjusted under 35 U.S.C. 154(b) by 14 days.

(21) Appl. No.: 14/115,039

(22) PCT Filed: May 18, 2012

(86) PCT No.: PCT/JP2012/063417
§ 371 (c)(1),
(2), (4) Date: Oct. 31, 2013

(87) PCT Pub. No.: WO2012/161298
PCT Pub. Date: Nov. 29, 2012

(65) Prior Publication Data
US 2014/0080342 A1    Mar. 20, 2014

(30) Foreign Application Priority Data
May 20, 2011    (JP) ................. 2011-113930

(51) Int. Cl.
*H01R 13/62*    (2006.01)
*H01R 13/629*    (2006.01)
*H01R 13/639*    (2006.01)
*B60L 11/18*    (2006.01)

(52) U.S. Cl.
CPC ...... *H01R 13/62955* (2013.01); *B60L 11/1818* (2013.01); *H01R 13/639* (2013.01); *Y02T 10/7005* (2013.01); *Y02T 90/14* (2013.01)

(58) Field of Classification Search
CPC .................. H01R 13/62933; H01R 13/6275; H01R 13/6272; G02B 6/3825; G02B 6/3821
USPC ............... 439/310, 350, 352, 372; 385/55, 77
See application file for complete search history.

(56) References Cited

U.S. PATENT DOCUMENTS

| 5,417,579 A | 5/1995 | Yoshioka et al. |
| 5,429,524 A | 7/1995 | Wakata et al. |
| 5,433,623 A * | 7/1995 | Wakata et al. ............ 439/310 |
| 5,529,510 A * | 6/1996 | Wakata et al. ............ 439/310 |

(Continued)

FOREIGN PATENT DOCUMENTS

| CN | 102017320 A | 4/2011 |
| JP | 6-302355 A | 10/1994 |

(Continued)

OTHER PUBLICATIONS

International Search Report dated Aug. 29, 2012 issued in International Application No. PCT/JP2012/063417 (PCT/ISA/210).

(Continued)

*Primary Examiner* — Thanh Tam Le
(74) *Attorney, Agent, or Firm* — Sughrue Mion, PLLC

(57) ABSTRACT

A half fitting prevention connector includes a cylindrical case, a connector body for supplying electric power that is slidably accommodated in a front half part of the cylindrical case, a lever rotatably attached to the cylindrical case, and a holder that has a lever receiving portion for receiving an end portion of the lever. The connector body is moved in the cylindrical case in accordance with a rotational operation of the lever. The holder is provided on a rotation locus of the lever. The end portion of the lever is received in the lever receiving portion of the holder in a state that the connector body is completely fitted with a mating connector by the rotational operation of the lever.

5 Claims, 5 Drawing Sheets

(56) References Cited

U.S. PATENT DOCUMENTS

| | | | |
|---|---|---|---|
| 5,558,533 A | 9/1996 | Hashizawa et al. | |
| 5,573,417 A | 11/1996 | Hashizawa et al. | |
| 5,674,086 A | 10/1997 | Hashizawa et al. | |
| 5,803,760 A | 9/1998 | Ito et al. | |
| 6,565,262 B2* | 5/2003 | Childers et al. | 385/76 |
| 7,104,702 B2* | 9/2006 | Barnes et al. | 385/77 |
| 7,204,644 B2* | 4/2007 | Barnes et al. | 385/77 |
| 7,377,699 B2* | 5/2008 | Terakura | 385/69 |
| 7,465,180 B2* | 12/2008 | Kusuda et al. | 439/352 |
| 8,070,367 B2* | 12/2011 | Winberg et al. | 385/81 |
| 2002/0177348 A1 | 11/2002 | Karamatsu et al. | |
| 2011/0034053 A1 | 2/2011 | Matsumoto et al. | |

FOREIGN PATENT DOCUMENTS

| | | |
|---|---|---|
| JP | 6-310204 A | 11/1994 |
| JP | 7-85926 A | 3/1995 |

OTHER PUBLICATIONS

Written Opinion dated Aug. 29, 2012 issued in International Application No. PCT/JP2012/063417 (PCT/ISA/237).
Office Action dated Dec. 16, 2014 issued by the Japanese Patent Office in counterpart Japanese Patent Application No. 2011-113930.
Communication dated May 4, 2015 issued by the State Intellectual Property Office of the People's Republic of China in counterpart Chinese Patent Application No. 201280024607.2 English Translation.

* cited by examiner

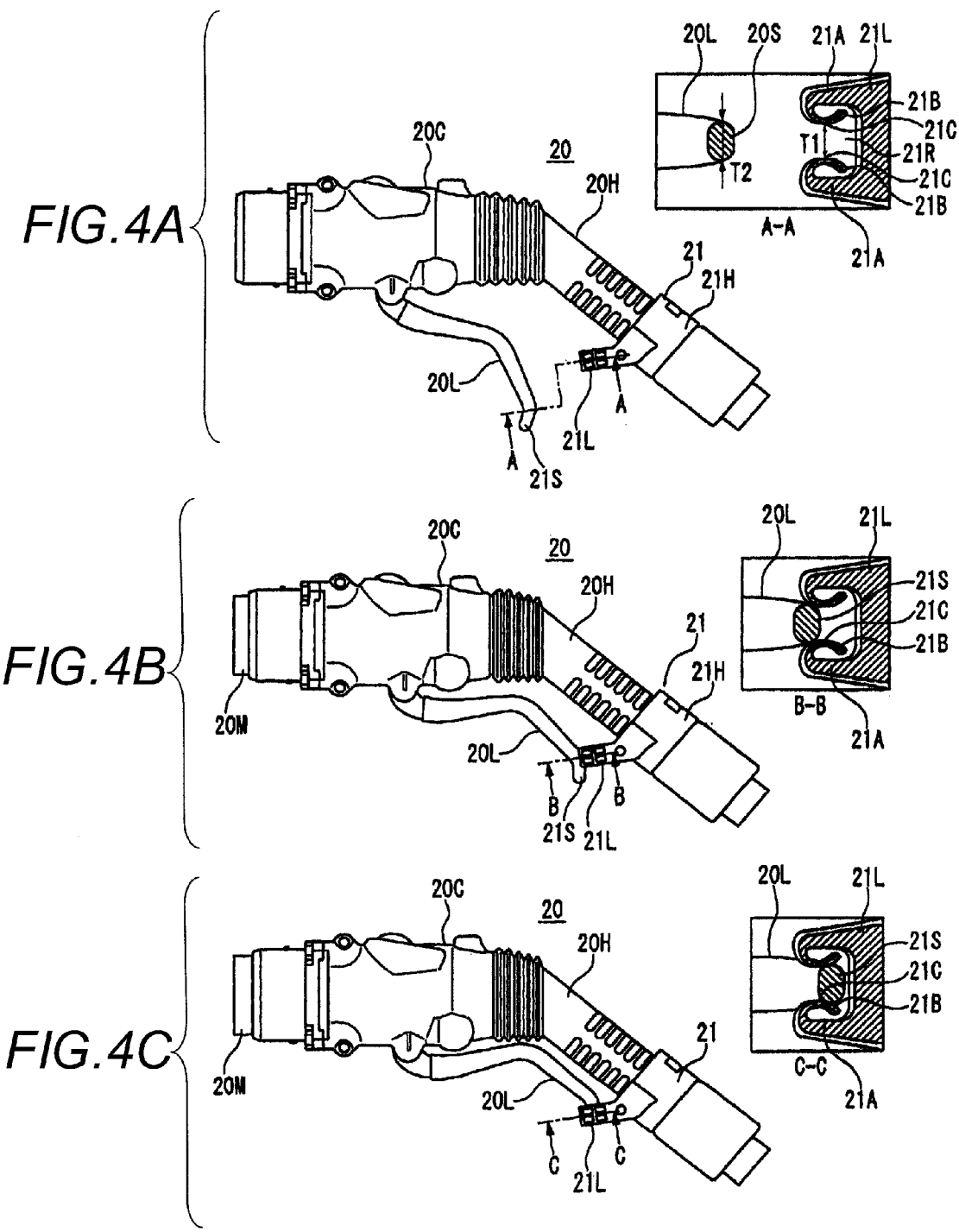

HALF FITTING PREVENTION CONNECTOR

TECHNICAL FIELD

The present invention relates to a power supply connector to be used for charging of, for example, an electric automobile, and also relates to a power supply connector which allows a fitting operation between power supply side and power reception side connectors to be carried out by a low insertion force and is capable of eliminating a half fitted state, and thereby preventing disconnection between terminals when supplying the power to the power reception side connector so as to prevent occurrence of arc discharge which may occur in the event of disconnection.

BACKGROUND ART

A power supply side connector which has a lever for a low insertion force and is to be fitted with a power reception side connector fixed to a vehicle body or the like of an automobile, is publicly known (see, e.g., PTL 1 (Patent Literature 1)).
[Configuration of a power supply connector described in PTL 1]
FIG. 5 is a vertical cross sectional view showing a power supply connector described in PTL 1.

As shown in FIG. 5, a power supply side connector 100 has a cylindrical case 100C, a connector body 100M which is slidably attached to a front half part of the cylindrical case 100C, is moved forward against a repulsive force of a coil spring when a rear end thereof is pushed by a handle 100H and accommodates a plurality of terminals therein, the handle 100H which is pivotally supported by a pin 100P2 inserted into a long cave hole at a rear half part of the cylindrical case 100C, a lever 100L of which the intermediate portion is pivotally attached in the cylindrical case 100C by a lever shaft 100P1 and of which the tip portion is pivotally supported by the pin 100P2 inserted into a shaft hole of the handle 100H and the long cave hole of the cylindrical case 100C, and a release lever 101 which blocks rotation of the lever 100L under a condition that the connector 100M and a counter side connector are fitted with each other. When the lever 100L is gripped toward the handle 100H side, a tip portion of the lever 100L at an active side is rotated centering around the lever shaft 100P1 so as to cause the connector body 100M to advance in a direction of the counter side connector so that the connector 100 is fitted with the counter side connector. As shown in an enlarged part (1) in FIG. 5, when the fitting is completed, a latch projection portion 101K formed at a tip portion of the release lever 101L is engaged with a latch step portion 100K formed at a tip portion of an action portion on the lever 100L so that the lever 100L is locked by the release lever 101.

CITATION LIST

Patent Literatures

[PTL 1]: JP-A-7-85926
[Problems of power supply connector described in PTL 1]
The power supply connector 100 is constituted such that in a case where an operation of fitting the power supply connector 100 is carried out, the fitting can be usually achieved when the lever 100L is gripped up. However, while the lever 100L is gripped and the operation of fitting with a counter side connector 200 is carried out, interference abrasion possibly occurs between both of connector housings. It is, for example, interference abrasion between a connector housing 100C1 and a connector housing 200C1 at a counter side shown in circle A in FIG. 5 or between a connector housing 100C2 and a connector housing 200C2 at a counter side shown in circle B in FIG. 5. When such interference abrasion occurs, the lever 100L is stopped under a condition that the lever 100L is not yet gripped up. With this, the latch projection portion 101K at the tip portion of the release lever 101 does not become in a state in which it is engaged with the latch step portion 100K of the lever 100L as shown in an enlarged part (1) in FIG. 5, but becomes in a state in which it is half engaged with the latch step portion 100K of the lever 100L as shown in an enlarged part (2) in FIG. 5. In the above half engaged state, a terminal 100T of the connector and a terminal 200T of the counter side connector are in a mutually connected state (see circle C in FIG. 5). However, since the lever IDOL is stopped in the half engaged state, the lever 100L is not locked. Therefore, when an impact is applied, the latch projection portion 101K at the tip portion of the release lever 101 and the latch step portion 100K of the lever 100L are possibly released from the half fitted state. With this, since the terminal 100T of the connector and the terminal 200T of the counter side connector may be released from the mutually connected state (i.e., a charging state), arc discharge possibly occurs between the terminals in the event of releasing so that the terminals are possibly damaged.

SUMMARY OF INVENTION

Technical Problem

The invention is made in order to solve the above problems, and the purpose of the invention is to provide a half fitting prevention connector that allows a lever not to stop in a half fitted state so as to be surely in complete fitting, physically locks the lever in the complete fitted state so as to prevent the lever from returning to its original position, and thereby prevents arc discharge.

Solution to Problem

In order to achieve the above purpose, the invention having aspects (1) to (3) relates to a half fitting prevention connecter and has following features.
(1) A half fitting prevention connector includes a cylindrical case, a connector body for supplying electric power that is slidably accommodated in a front half part of the cylindrical case, a lever rotatably attached to the cylindrical case, and a holder that has a lever receiving portion for receiving an end portion of the lever. The connector body is moved in the cylindrical case in accordance with a rotational operation of the lever. The holder is provided on a rotation locus of the lever. The end portion of the lever is received in the lever receiving portion of the holder in a state that the connector body is completely fitted with a mating connector by the rotational operation of the lever.
(2) For example, the half fitting prevention connector further includes a handle that has a distal end portion to which the connector body is attached, and slides together with the connector body in accordance with the rotational operation of the lever, the holder includes a holder body which is attached to the handle and a slider which is slidably attached to the holder body and is urged in a first direction by an elastic member, the slider has the lever receiving portion and a projection with a tapered face, and in accordance with the rotational operation of the lever, the slider slides against the urging of the elastic member in a second direction opposite to the first direction while the end portion of the lever is brought into contact with the tapered face of the projection, and thereby the end portion of the lever is received in the lever receiving portion.

(3) For example, the half fitting prevention connector further includes a handle that has a distal end portion to which the connector body is attached, and slides together with the connector body in accordance with the rotational operation of the lever, the holder includes a holder body which is attached to the handle and a lever holding section which is provided on the holder body, the lever holding section has extension portions respectively extending toward the lever and elastic curved portions which are respectively curved in arc shapes from tip portions of the extension portions in mutually facing directions, and the lever holding section and the elastic curved portions form the lever receiving portion.

Advantageous Effects of Invention

In accordance with the above aspect (1) of the invention, since the lever is received in the lever receiving portion and is constrained therein under a condition that the connectors are completely fitted with each other, terminals are not separated from each other. Therefore, arc is not generated so that the connectors are not damaged.

In accordance with the above aspect (2) of the invention, since the lever is received in the lever receiving portion and is constrained therein in a simple structure, terminals of the connectors are not separated from each other. Therefore, arc is not generated so that the connectors are not damaged.

In accordance with the above aspect (3) of the invention, since the lever is received in the lever receiving portion and is constrained therein in a structure simpler than that of the aspect (2), terminals of the connectors are not separated from each other. Therefore, arc is not generated so that the connectors are not damaged.

BRIEF DESCRIPTION OF DRAWINGS

FIGS. 1A to 1D are elevational views showing a half fitting prevention connector according to an embodiment 1 of the present disclosure, wherein FIG. 1A shows a state of the half fitting prevention connector before fitting, FIG. 1B shows a state of the half fitting prevention connector just after starting of the fitting, FIG. 1C shows a state of the half fitting prevention connector just before completion of the fitting, and FIG. 1D shows a state of the half fitting prevention connector at the completion of the fitting.

FIGS. 2A and 2B are schematic views explanatorily showing a holder according to the embodiment 1, wherein FIG. 2A is a perspective view, and FIG. 2B is a cross section view taken along a longitudinal section of a coil spring.

FIGS. 3A and 3B are exploded perspective views showing the holder shown in FIG. 2A, wherein FIG. 3A is an exploded perspective view showing the holder viewed from a slider side, and FIG. 3B is an exploded perspective view showing the holder viewed from a coil spring side.

FIGS. 4A to 4C are elevational views showing a half fitting prevention connector according to an embodiment 2 of the invention, FIG. 4A shows a state of the half fitting prevention connector before fitting, FIG. 4B shows a state of the half fitting prevention connector just before completion of the fitting, and FIG. 4C shows a state of the half fitting prevention connector at the completion of the fitting.

DESCRIPTION OF EMBODIMENTS

Figure 1A:
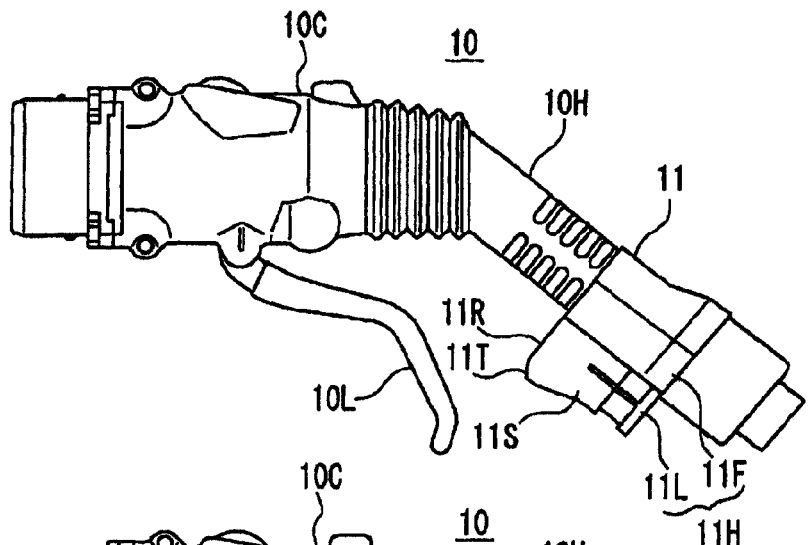
Figure 1B:
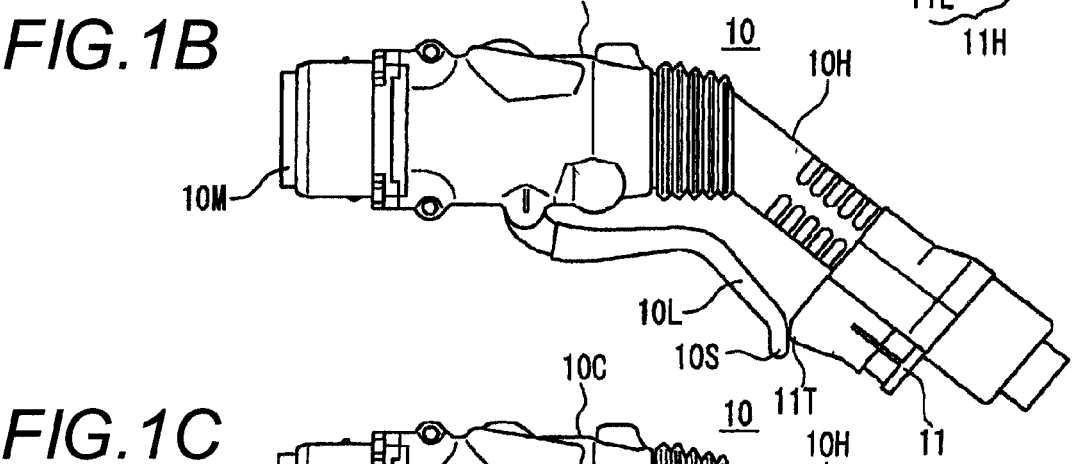

Half Fitting Prevention Connector According to Embodiment 1 of the Present Disclosure Next, a half fitting prevention connector according to an embodiment 1 of the present disclosure is described with reference to accompanying drawings. FIGS. 1A and 1B are elevational views showing the half fitting prevention connector according to the embodiment 1, wherein FIG. 1A is an elevational view showing a state of the half fitting prevention connector before fitting. In FIG. 1A, a half fitting prevention connector 10 is a power supply side connector to be fitted with a power reception side connector of a battery mounted on an automobile. The half fitting prevention connector 10 has a cylindrical case 10C, a connector body 10M (shown in FIG. 1B), a lever 10L and a handle 10H.

The cylindrical case 10C, the connector body 10M, the lever 10L and the handle 10H are described below. Since each of the cylindrical case 10C, the connector body 10M, the lever 10L and the handle 10H has a structure same as each of the cylindrical case 100C, the connector body 100M, the lever 100L and the handle 100H shown in FIG. 5, FIG. 5 is cited on an as-needed basis.

[Cylindrical Case 10C]

Figure 5:
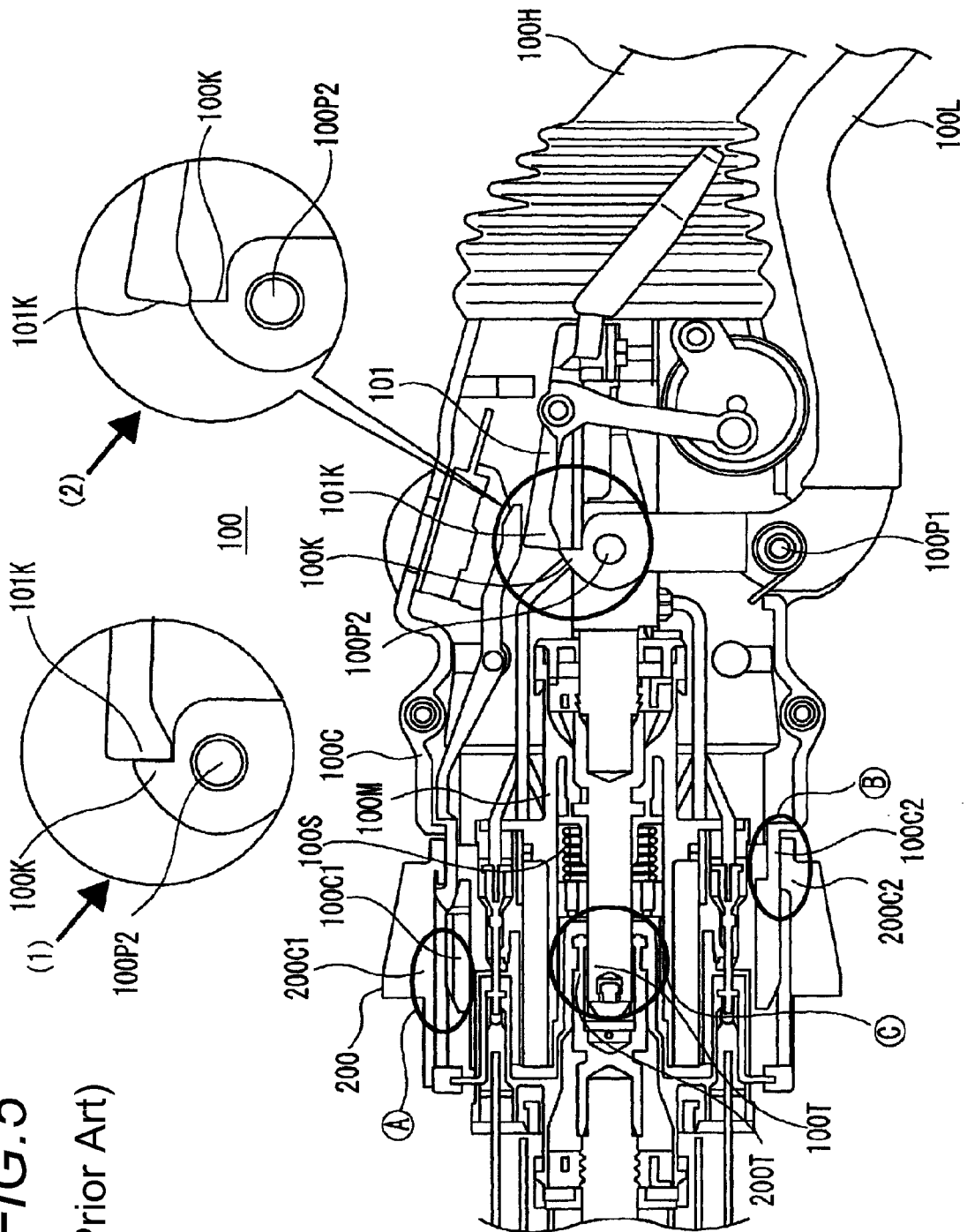
FIG. 5 is an elevational view showing a connector with a handle described in PTL 1.

The cylindrical case 10C (corresponding to 100C in FIG. 5), slidably accommodates the connector body 10M (see FIG. 1B) in its front half part, the handle 10H is pivotally supported by a pin 100P2 (see FIG. 5) inserted into a long cave hole at a rear half part of the cylindrical case 10C, and an intermediate portion of the lever 10L is pivotally attached to the cylindrical case 10C by a lever shaft 100P1 (see FIG. 5).

[Connector Body 10M]

The connector body 10M (corresponding to 100M in FIG. 5) is configured to accommodate a plurality of terminals. The connector body 10M is slidably accommodated in the front half part of the cylindrical case 10C. The connector body 10M is always urged in the backward direction (in the anti-fitting direction) by a repulsive force of a coil spring 100S (see FIG. 5). By pushing a rear end of the connector body 10M by means of the handle 10H, the connector body 10M advances in the fitting direction in the cylindrical case 10C against the repulsive force of the coil spring 100S.

[Lever 10L]

An intermediate portion of the lever 10L (corresponding to 100L in FIG. 5) is pivotally attached to the rear part of the cylindrical case 10C by the lever shaft 100P1 (see FIG. 5) and the tip portion of the lever 10L is pivotally supported by the pin 100P2 (see FIG. 5) inserted into the long cave hole of the cylindrical case 10C together with a shaft hole of the handle 10H.

[Handle 10H]

The handle 10H (corresponding to 100H in FIG. 5) is formed in a L shaped tubular long body. Electric wire cables are inserted in the handle 10H, and tip portions of the electric wire cables are respectively connected to the terminals in the connector body 10M.

The handle 10H is pivotally supported on the cylindrical case 10C together with the tip portion of the lever 10L by a pin 100P2 (see FIG. 5) inserted into the long cave hole at the rear half part of the cylindrical case 10C.

Therefore, when the lever 10L is gripped up toward the handle 10H by a user, a tip portion of the lever 10L at an action side is rotated centering around the lever shaft 10P1 so as to cause the handle 10H to advance. With this, the handle 10H pushes the rear end of the connector body 10M, and thereby the connector body 10M is moved forward in the cylindrical case 10C against the repulsion force of the coil spring 100S so as to be fitted with a counter side connector (a power reception side connector).

Since structures of the power supply side connector other than the above are also publicly known (e.g., PTL 1 and the like) and are not directly related to the invention, the descriptions regarding the non relation parts are omitted.

The half fitting prevention connector 10 according to the embodiment 1 of the present disclosure features that the handle 10H is provided with a holder 11 described below.

[Holder 11]

The holder 11 according to the embodiment 1 is described below with reference to FIGS. 2A to 3B.

Figure 2A:
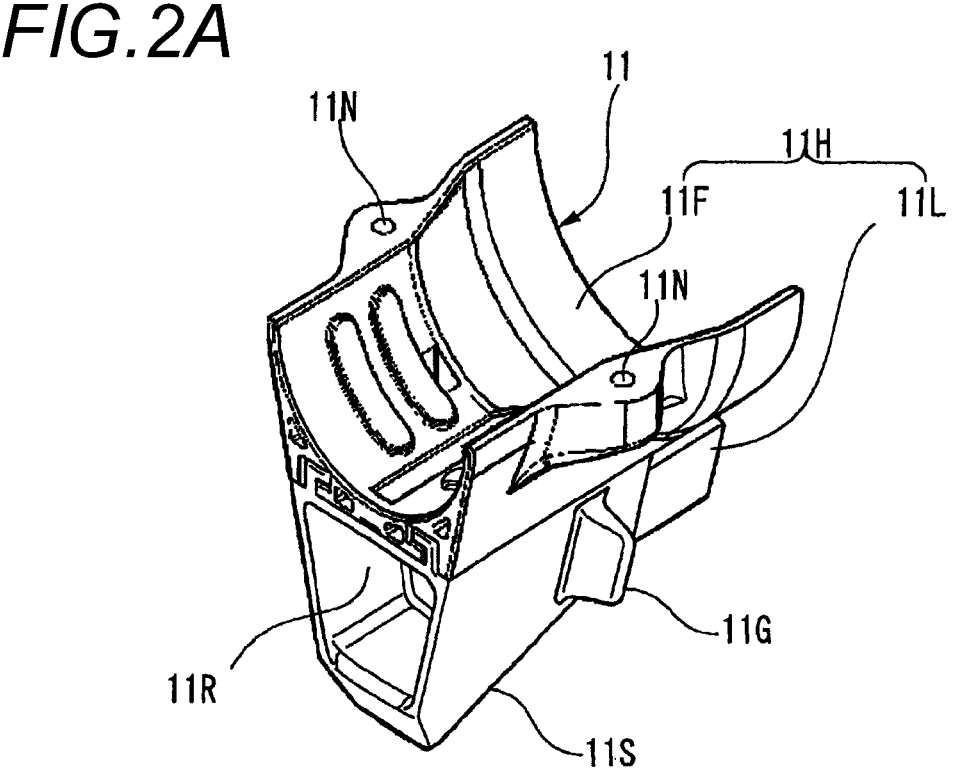
Figure 2B:
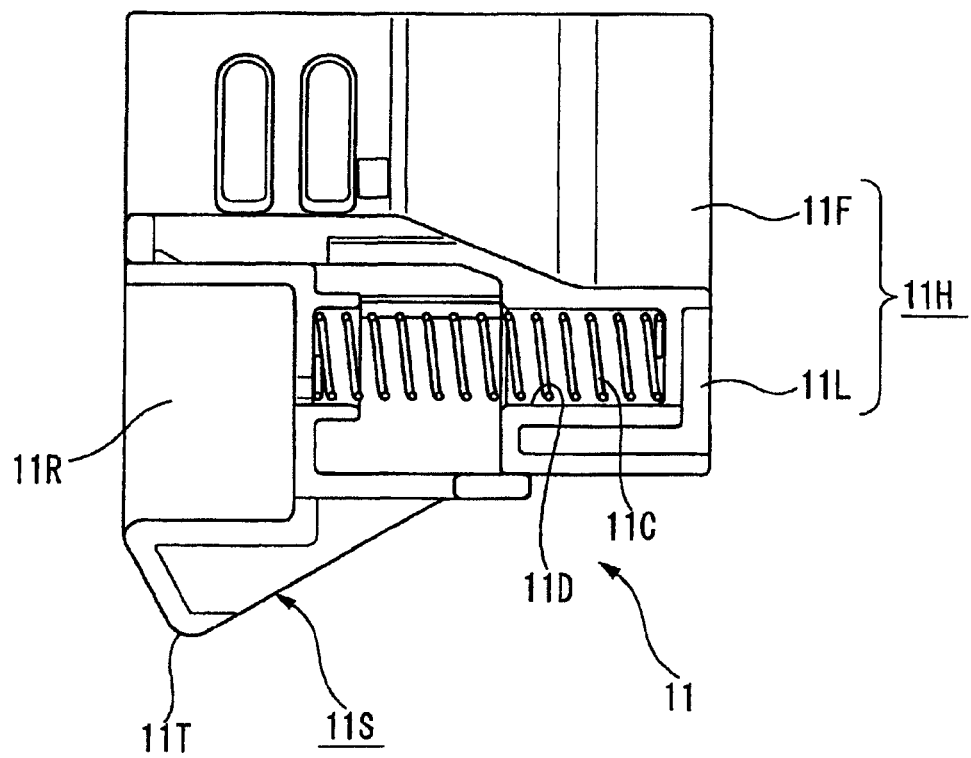
Figure 3A:
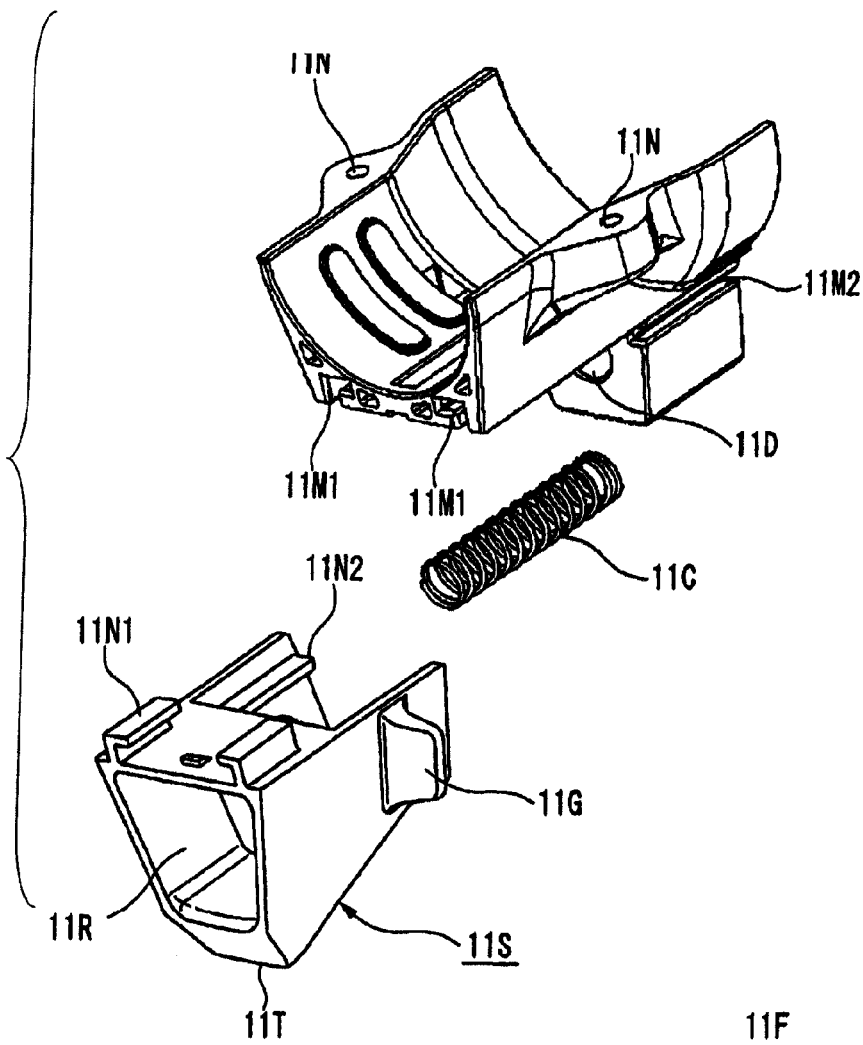
Figure 3B:
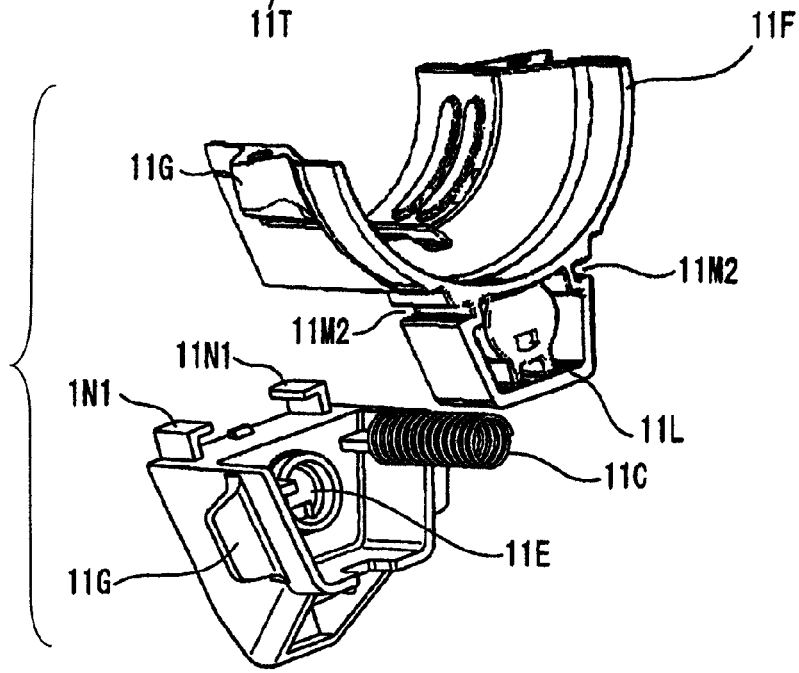

FIGS. 2A and 2B are schematic views explanatorily showing the holder 11 according to the embodiment 1, wherein FIG. 2A is a perspective view of the holder 11, and FIG. 2B is a cross section view of the holder 11 taken along a longitudinal section of a coil spring. FIGS. 3A and 3B are exploded perspective views showing the holder 11 shown in FIG. 2A, wherein FIG. 3A is an exploded perspective view showing the holder 11 viewed from a slider side, and FIG. 3A is an exploded perspective view showing the holder 11 viewed from a coil spring side.

In FIGS. 2A to 3B, the holder 11 is configured by a holder body 11H attached to the handle 10H (see FIG. 1A), a slider 11S slidably attached to the holder body 11H and a coil spring 11C.

[Holder Body 11H]

The holder body 11H has a handle fixing section 11F to be fixed to the handle 10H and a slider placement section 11L protruding toward an anti-handle side from the handle fixing section 11F.

[Handle Fixing Section 11F]

The handle fixing section 11F is formed in a long box shaped portion having a semicylinder part for surrounding a cylindrical portion of the handle 10H. The semicylinder part is attached to the handle 10H, and another long box shaped member (not shown) including a semicylinder part for similarly surrounding the cylindrical portion is attached to the handle 10H so as to face the handle fixing section 11F. Screws are screwed into screw holes 11N at coincident abutment portions of the handle fixing section 11F and the box shaped member, and thereby the handle fixing section 11F is fixed to the handle 10H.

Hook-shaped long grooves 11M1 and 11M1 (shown in FIG. 3A) each having a hook-shaped cross section are formed on the handle fixing section 11F along the both ends in the longitudinal direction. Hook-shaped projections 11N1 and 11N1 (shown in FIG. 3A) of the slider 11S (described later) are respectively fitted into the hook-shaped long grooves 11M1 and 11M1.

[Slider Placement Section 11L]

The slider placement section 11L is so constituted that the outer shape thereof integrally formed with the handle fixing section 11F from the handle fixing section 11F to the anti-handle side is formed in a rectangular solid shape, and the length in the longitudinal direction is roughly half of the length of the handle fixing section 11F. Long grooves 11M2 and 11M2 (shown in FIG. 3A) are formed in the vicinity of a coupling portion of the slider placement section 11L with the handle fixing section 11F along the both ends in the longitudinal direction. Projections 11N2 and 11N2 (shown in FIG. 3A) of the slider 11S (described later) are fitted into the long grooves 11M2 and 11M2. A cylindrical coil spring storage chamber 11D (shown in FIG. 2B and FIG. 3A) is formed in a longitudinal direction passing through the center of the rectangular solid of the slider placement section 11L. A rear part of the coil spring 11C (described later) is stored in the coil spring storage chamber 11D.

[Slider 11S]

The slider 11S is a member to be slidably attached to the holder body 11H. The lever receiving chamber 11R (see FIG. 1D, FIGS. 2A and 2B and FIG. 3A) into which a tip portion 10S of the lever 10L (see FIG. 1A) is entered, is formed on the slider 11S at a side facing the lever 10L, and a coil spring tip latch section 11E (shown in FIG. 3B) is formed thereon at a rear side of an innermost wall of the lever receiving chamber 11R. The hook-shaped projections 11N1 and 11N1 (shown in FIGS. 3A and 3B) are formed on the lever receiving chamber 11R at a ceiling side (a side facing the handle 10H) so as to have a predetermined interval therebetween. The predetermined interval is the same as an interval between the hook-shaped long grooves 11M1 and 11M1 formed on the slider placement section 11L. The projections 11N2 and 11N2 (shown in FIG. 3A) are formed on the slider 11S at inner side upper parts of both-side wall extension portions of the lever receiving chamber 11R so as to have a predetermined interval. The predetermined interval is the same as an interval between the long grooves 11M2 and 11M2 formed on the slider placement section 11L. Knobs 11G are formed on the lever receiving chamber 11R at the respective both outsides of the both-side wall extension portions. A projection 11T with a tapered face (shown in FIG. 2B) is formed on the lever receiving chamber 11R at the outside of its bottom portion.

[Coil Spring 11C]

When the slider 11S is slidably attached to the holder body 11H, the coil spring 11C is stored in a space formed between the coil spring tip latch section 11E (shown in FIG. 3B) of the slider 11S and the coil spring storage chamber 11D (shown in FIG. 3A) of the slider placement section 11L. The coil spring storage chamber 11D is always urged toward the lever 10L (see FIG. 1A) by a resilient force of the coil spring 11C so that the slider 11S is always urged to one end (a left end in FIG. 2B) on the holder body 11H.

[Operation of Half Fitting Prevention Connector According to Embodiment 1]

Figure 1C:
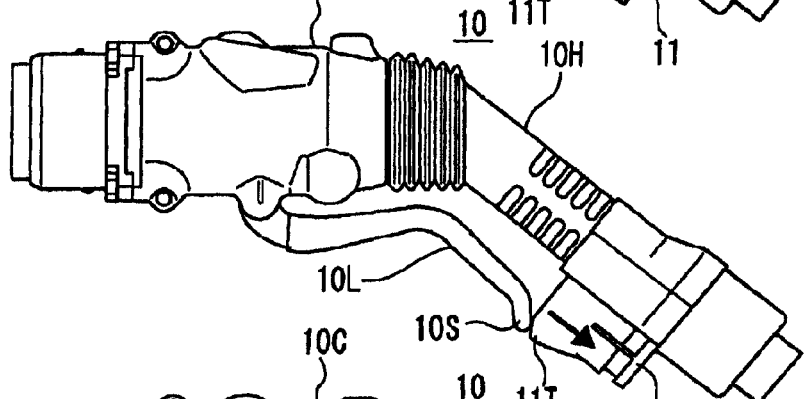

An operation of the half fitting prevention connector according to the embodiment 1 is described by returning to FIG. 1A. FIG. 1A shows a state of the half fitting prevention connector before fitting, FIG. 1B shows a state of the half fitting prevention connector just after starting of the fitting, FIG. 1C shows a state of the half fitting prevention connector just before completion of the fitting, and FIG. 10 shows a state of the half fitting prevention connector at the completion of the fitting. The descriptions are set forth below in this order.

[State Before the Fitting]

In FIG. 1A showing a state of the half fitting prevention connector before fitting, since the lever 10L is not yet gripped, a state is maintained in which the connector body 10M (see FIG. 1B) is accommodated in the cylindrical case 10C, and the connector body 10M is invisible in the drawing.

[State Just after Starting of the Fitting]

In FIG. 1B showing a state of the half fitting prevention connector just after starting of the fitting, the lever 10L is gripped and the tip portion 10S of the lever 10L is in contact with the projection 11T with the tapered face of the slider 11S. However, the slider 11S is not yet moved backward. In this state, a part of the connector body 10M is going to be exposed from the cylindrical case 10C.

[State of the Half Fitting Prevention Connector Just Before Completion of the Fitting]

In FIG. 1C showing a state of the half fitting prevention connector just before completion of the fitting, the lever 10L is deeply gripped, and the connector body 10M is further exposed from the cylindrical case 10C. The tip portion 10S of the lever 10L is brought into contact with the tapered portion of the projection 11T with the tapered face of the slider 11S so as to push it backward.

[State of Completion of the Fitting]

Figure 1D:
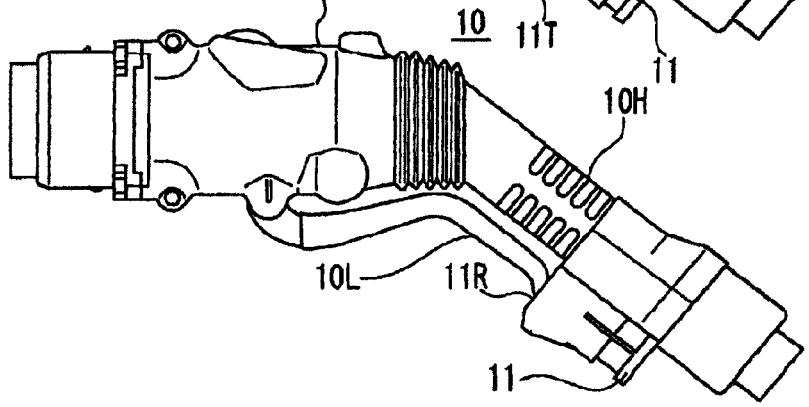

In FIG. 1D showing a state of the half fitting prevention connector at completion of the fitting, the lever 10L is more deeply gripped so that the connector body 10M is exposed from the cylindrical case 10C. In this state, the connector body 10M is completely fitted with a counter side connector (not shown). In addition, the tip portion 10S of the lever 10L is allowed to climb down the taper of the projection 11T to its final position so as to be fitted with the lever receiving section 11R of the slider 11S. With this, the slider 11S is pushed to return to its original position by a resilient force of the coil spring, and thereby the lever 10L is not able to get out from the lever receiving section 11R to become in a locked state so that the lever 10L is not able to return to the original position. When releasing, a user may intentionally pull the knob 11G disposed on the side face of the slider 11S by its hand, thereby the slider 11S is pushed down, and the lever 10L is released from the lever receiving section 11R of the slider 11S so as to be restored to the original position by the resilient force of the coil spring 11C.

In accordance with the invention, it is featured that the connector is so constituted that the lever 10L can be fitted with the lever receiving section 11L by only a series of operations of gripping the lever 10L in a usual manner. By applying a force of pushing down the slider 11S, the lever 10L can be gripped up to its final state by an inertial force of a gripping after pushing down the slider 11S. Meanwhile, when the slider 11S is in the contact state, (1) a main terminal is in an on-state and a signal terminal is in an off-state, or (2) the main terminal is in an off-state and the signal terminal is in the off-state.

[Half Fitting Prevention Connector According to Embodiment 2 of the Present Disclosure]

Next, a half fitting prevention connector according to an embodiment 2 of the present disclosure is described with reference to accompanying drawings. FIGS. 4A to 4C are elevational views showing the half fitting prevention connector according to the embodiment 2, wherein FIG. 4A shows a state of the half fitting prevention connector before fitting, having a squared area which is a cross sectional view of a lever and a holder in FIG. 4A taken along a line from arrow A to arrow A, FIG. 4B is an elevational view showing a state of the half fitting prevention connector just before completion of the fitting, having a squared area which is a cross sectional view of the lever and the holder in FIG. 4B taken along a line from arrow B to arrow B, and FIG. 4C is an elevational view showing a state of the half fitting prevention connector at the completion of the fitting, having a squared area which is a cross sectional view of the lever and the holder in FIG. 4C taken along a line from arrow C to arrow C.

The half fitting prevention connector 20 according to the embodiment 2 of the present disclosure features that a handle 20H is provided with a holder 21 as described below.

[Holder 21]

The holder 21 has a holder body 21H attached to the handle 10H (see FIG. 1A) and a lever holding section 21L attached to a lower end of the holder body 21H.

[Holder Body 21H]

The holder body 21H is a member fixed to the handle 10H. The holder body 21H can be basically formed of, as in the embodiment 1, a long box shaped portion having a semicylinder part for surrounding a cylindrical portion of the handle 10H and another long box shaped member including a semicylinder part for similarly surrounding the cylindrical portion. Alternately, it can be a member of a simple belt like winding type.

[Lever Holding Section 21L]

The lever holding section 21L is a member to be attached to holder body 21H. In FIG. 4A, the lever holding section 21L has extension portions 21A and 21A respectively extending from both ends of an edge portion, and elastic curved portions 21B and 21B which are respectively curved in arc shapes from tip portions of the extension portions 21A and 21A in mutually facing directions. An interval T1 between apex portions 21C and 21C of the elastic curved portions 21B and 21B is smaller than a outer diameter T2 expressed by a cross section of a tip portion 20S of the lever 20L. A space formed by the edge portion of the lever holding section 21L, the elastic curved portions 21B and 21B and the apex portions 21C and 21C thereof is a lever receiving portion 21R.

[Operation of Half Fitting Prevention Connector According to Embodiment 2]

Turning to FIG. 4A, an operation of a half fitting prevention connector according to an embodiment 2 is described below. FIG. 4A shows a state of the half fitting prevention connector before fitting, FIG. 4B shows a state of the half fitting prevention connector just before completion of the fitting, and FIG. 4C shows a state of the half fitting prevention connector at the completion of the fitting. The descriptions are set forth in this order.

[State Before the Fitting]

As shown in FIG. 4A, since the lever 20L is not yet gripped, a state is maintained in which the connector body 20M (see FIG. 4B) is accommodated in the cylindrical case 20C, and it is invisible in the drawing.

[State Just Before Completion of the Fitting]

FIG. 4B shows a state just before completion of the fitting. In that state, the lever 20L is deeply gripped, the tip portion 20S of the lever 20L is in contact with the elastic curved portions 21B and 21B of the lever holding section 21L so as to push and expand the elastic curved portions 21B and 21B, and thereby the tip portion 20S is in a state just before overriding the apex portions 21C and 21C. The connector body 20M is exposed from the cylindrical case 20C.

[State of Completion of the Fitting]

In FIG. 4C showing a state of completion of the fitting, the lever 20L is more deeply gripped so as to expose the connector body 20M from the cylindrical case 20C. In this state, the connector body 20M is completely fitted with a counter side connecter (not shown). In addition, the tip portion 20S of the lever 20L has overridden the apex portions 21C and 21C of the elastic curved portions 21B and 21B so that it is received in the lever receiving portion 21R.

With this, the lever 20L is not able to get out from the lever receiving portion 21R to become in a locked state so that the lever 20L is not able to return to the original position. When releasing, a user may intentionally and strongly pull the lever 20L in the opposite direction by its hand, thereby the elastic curved portions 21B and 21B are pushed down, and the lever 20L is released from the lever receiving portion 21R so as to be restored to the original position by the resilient force of the coil spring.

In accordance with the invention, the half fitting prevention connector is configured such that the lever 20L is fitted with the lever holding section 21L only by gripping the lever 20L in a usual manner. In addition, by applying a force for pushing and expanding the elastic curved portions 21B and 21B of the lever holding section 21L, the lever 20L can be gripped up to its final state by an inertial force of gripping after pushing and expanding the lever holding section 21L. Meanwhile, when the lever holding section 21L is in the contact state, (1) a main terminal is in an on-state and a signal terminal is in an off-state, or (2) the main terminal is in an off-state and the signal terminal is in the off-state.

Another Embodiment

While the holder according to the embodiments 1 and 2 is attached to the handle which slides together with the connector, the invention is not limited to those embodiments, and such holder can be applied to a handle not having a slide mechanism, similarly.

OVERVIEW

In accordance with the invention, since the lever is received in the lever receiving portion and is constrained therein under a condition that the connectors are completely fitted with each other, the terminals of the connectors are not separated from each other. Therefore, arc is not generated so that the connectors are not damaged.

The present application is based on Japanese Patent Application No. 2011-113930 filed on May 20, 2011, the contents of which are incorporated herein by reference.

INDUSTRIAL APPLICABILITY

By the above configurations of the present disclosure, the half fitting prevention connector that prevents the lever from returning to its original position after the completion of completely fitted state of the connectors, and also prevents arc discharge can be obtained.

REFERENCE SIGNS LIST 10 half fitting prevention connector
10C cylindrical case
10H handle
10L lever
10M connector body
10S tip portion of lever
11 holder according to embodiment 1
11C coil spring
11D coil spring storage chamber
11E coil spring tip latch section
11F handle fixing section
11G knob
11H holder body
11L slider placement section
11M1 hook-shaped long groove
11M2 long groove
11N screw hole
11N1 hook-shaped projection
11N2 projection
11R lever receiving chamber
11S slider
11T projection with tapered face
20 half fitting prevention connector
21 holder according to embodiment 2
21A extension portion
21B elastic curved portion
21C apex portion
21H holder body
21L lever holding section

The invention claimed is:
1. A half fitting prevention connector, comprising:
a cylindrical case;
a connector body for supplying electric power that is slidably accommodated in a front half part of the cylindrical case;
a lever rotatably attached to the cylindrical case; and
a holder that has a lever receiving portion for receiving an end portion of the lever,
wherein the connector body is moved in the cylindrical case in accordance with a rotational operation of the lever;
wherein the holder is provided on a rotation locus of the lever; and
wherein the connector body is slidable between a first position in which the connector body is accommodated in the cylindrical case, and a second position in which the end portion of the lever is received in the lever receiving portion of the holder and the connector body is exposed from the cylindrical case, thereby allowing complete fitting with a mating connector by the rotational operation of the lever.

2. The half fitting prevention connector according to claim 1, further comprising:
a handle that has a distal end portion to which the connector body is attached, and slides together with the connector body in accordance with the rotational operation of the lever,
wherein the holder includes:
a holder body which is attached to the handle; and
a slider which is slidably attached to the holder body and is urged in a first direction by an elastic member;
wherein the slider has the lever receiving portion and a projection with a tapered face; and
wherein in accordance with the rotational operation of the lever, the slider slides against the urging of the elastic member in a second direction opposite to the first direction while the end portion of the lever is brought into contact with the tapered face of the projection, and thereby the end portion of the lever is received in the lever receiving portion.

3. The half fitting prevention connector according to claim 1, further comprising:
a handle that has a distal end portion to which the connector body is attached, and slides together with the connector body in accordance with the rotational operation of the lever,
wherein the holder includes:
a holder body which is attached to the handle; and
a lever holding section which is provided on the holder body;
wherein the lever holding section has extension portions respectively extending toward the lever and elastic curved portions which are respectively curved in arc shapes from tip portions of the extension portions in mutually facing directions; and
wherein the lever holding section and the elastic curved portions form the lever receiving portion.

4. The half fitting prevention connector according to claim 1, wherein a whole of the end portion of the lever is received in the lever receiving portion of the holder.

5. The half fitting prevention connector according to claim 1, wherein the lever receiving portion is provided on an outer face of the holder so as to protrude toward the outside of the holder.

* * * * *